United States Patent
Johns et al.

(10) Patent No.: US 10,169,287 B2
(45) Date of Patent: *Jan. 1, 2019

(54) IMPLEMENTING MODAL SELECTION OF BIMODAL COHERENT ACCELERATOR

(71) Applicant: International Business Machines Corporation, Armonk, NY (US)

(72) Inventors: Charles R. Johns, Austin, TX (US); Andrew T. Koch, Mountain View, CA (US); Gregory M. Nordstrom, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,293

(22) Filed: Oct. 31, 2017

(65) Prior Publication Data

US 2018/0052801 A1 Feb. 22, 2018

Related U.S. Application Data

(63) Continuation of application No. 14/606,296, filed on Jan. 27, 2015, now Pat. No. 9,842,081.

(51) Int. Cl.
*G06F 13/42* (2006.01)
*G06F 13/40* (2006.01)
*G06F 13/38* (2006.01)
*G06F 9/445* (2018.01)
*G06F 9/4401* (2018.01)

(52) U.S. Cl.
CPC ........ *G06F 13/4282* (2013.01); *G06F 9/4411* (2013.01); *G06F 9/44505* (2013.01); *G06F 13/385* (2013.01); *G06F 13/4022* (2013.01); *G06F 13/4027* (2013.01)

(58) Field of Classification Search
CPC ............... G06F 13/4282; G06F 9/4411; G06F 9/44505; G06F 13/385; G06F 13/4022; G06F 13/4027; H05K 999/99
USPC ......................................................... 710/72
See application file for complete search history.

(56) References Cited

U.S. PATENT DOCUMENTS

| 7,689,751 | B2 | 3/2010 | Feehrer |
| 7,827,343 | B2 | 11/2010 | Frey et al. |
| 7,979,592 | B1 | 7/2011 | Pettrey |

(Continued)

OTHER PUBLICATIONS

PCI-SIG Engineering Change Notice, Feb. 12, 2015 pp. 1-9.

(Continued)

*Primary Examiner* — Paul R. Myers
(74) *Attorney, Agent, or Firm* — Joan Pennington

(57) ABSTRACT

A method and apparatus are provided for implementing modal selection of a bimodal coherent accelerator in a computer system. Implementing modal selection of a bimodal coherent accelerator using a PCI-Express standard Vendor Specific Extended Capability (VSEC) structure or CAPI VSEC data in the configuration space of a CAPI-capable PCIE adapter and procedures defined in the Coherent Accelerator Interface Architecture (CAIA) to enable and control a coherent coprocessor adapter over PCIE. A CAPI-capable PCIE adapter is enabled to be bimodal and operate in conventional PCI-Express (PCIE) transaction modes or CAPI modes that utilize CAIA coherence and programming interface capabilities.

10 Claims, 5 Drawing Sheets

(56) References Cited

U.S. PATENT DOCUMENTS

| | | | |
|---|---|---|---|
| 8,463,969 B2 | 6/2013 | Shah et al. | |
| 8,495,252 B2 | 7/2013 | Lais et al. | |
| 8,521,941 B2 | 8/2013 | Regula | |
| 8,539,134 B2 | 9/2013 | Bacher et al. | |
| 9,811,498 B2 * | 11/2017 | Johns | G06F 13/4282 |
| 9,842,081 B2 * | 12/2017 | Johns | G06F 13/4282 |
| 2010/0153685 A1 | 6/2010 | Yehia | |
| 2012/0284446 A1 | 11/2012 | Biran et al. | |
| 2013/0145071 A1 | 6/2013 | Chu et al. | |
| 2014/0108697 A1 | 4/2014 | Wagh | |
| 2014/0201467 A1 | 7/2014 | Blaner et al. | |
| 2014/0379997 A1 | 12/2014 | Blaner et al. | |
| 2015/0220461 A1 | 9/2015 | Auernhammer et al. | |
| 2015/0261707 A1 | 9/2015 | Craddock et al. | |
| 2016/0147984 A1 | 5/2016 | Bakke et al. | |
| 2016/0188780 A1 | 6/2016 | Greenwood et al. | |
| 2016/0217101 A1 | 7/2016 | Johns et al. | |

OTHER PUBLICATIONS

Coherent Accelerator Processor Interface (CAPI) for Power8 Systems, White Paper, Bruce Wile, Sep. 29, 2014, pp. 1-13.
Overview of Changes to PCI Express, Sep. 1.1, Mindshare, Jun. 2005.
Pwer8 Processor Packs a Twelve-Core Punch—and Then Some, Sep. 9, 2013.
PCI Express Base Specification Revision 3.0, Nov. 10, 2010.
Appendix P—List of IBM Patents or Patent Applications Treated as Related Nov. 6, 2017.

\* cited by examiner though only one CPU is shown in FIGS. 1 and 2.

IMPLEMENTING MODAL SELECTION OF BIMODAL COHERENT ACCELERATOR

This application is a continuation application of Ser. No. 14/606,296 filed Jan. 27, 2015.

FIELD OF THE INVENTION

The present invention relates generally to the data processing field, and more particularly, relates to method and apparatus for implementing modal selection of a bimodal coherent accelerator in a computer system.

DESCRIPTION OF THE RELATED ART

Peripheral Component Interconnect Express (PCIE) has become the industry standard IO bus for server computer systems, as well as personal computers (PCs). Traditionally, servers install PCIE IO adapters (IOAs) in slots within a system unit that connect through a PCI host bridge to the system memory and processor buses.

A need exists for an efficient and effective method and apparatus for implementing detection and modal selection of a bimodal coherent accelerator, such as a Coherently Attached Processor Interface (CAPI) accelerator unit in a computer system.

SUMMARY OF THE INVENTION

Principal aspects of the present invention are to provide a method and apparatus for implementing detection and modal selection of a bimodal coherent accelerator in a computer system. Other important aspects of the present invention are to provide such method and apparatus substantially without negative effects and that overcome many of the disadvantages of prior art arrangements.

In brief, a method and apparatus are provided for implementing detection and modal selection of a bimodal coherent accelerator in a computer system. Implementing modal selection of a bimodal coherent accelerator using a PCI-Express standard Vendor Specific Extended Capability (VSEC) structure containing CAPI VSEC data in the configuration space of a CAPI-capable PCIE adapter and procedures defined in the Coherent Accelerator Interface Architecture (CAIA) to enable and control a coherent coprocessor adapter over PCIE. A CAPI-capable PCIE adapter is enabled to be bimodal and operate in conventional PCI-Express (PCIE) transaction modes or CAPI modes that utilize CAIA coherence and programming interface capabilities.

In accordance with features of the invention, the CAPI-capable PCIE adapter is enabled to be selectively configured and enabled in either PCIE transaction mode or CAPI mode by configuration firmware in the computer system or server system in which the PCIE IO adapter is installed.

In accordance with features of the invention, firmware first determines if the PCIE slot in which an adapter is plugged is itself capable of operating in CAPI mode. If the slot containing the adapter is CAPI capable, as part of firmware inspection of the adapter PCIE configuration space the firmware searches for a CAPI VSEC structure in a configuration space capability list. As the CAPI VSEC is a vendor defined structure, the firmware includes knowledge of specific PCIE vendor IDs that implement a CAPI VSEC according to the inventive definition of the VSEC. Alternatively, CAPI VSEC data may be encapsulated in other PCIE configuration structures of a CAPI-capable adapter, such as vital product data (VPD) within another space of the adapter, or other configuration registers or structures suitably extended to contain CAPI VSEC data. Firmware may detect and select the operating mode of the adapter irrespective of the particular configuration structure that contains CAPI VSEC data.

In accordance with features of the invention, at any time that firmware detects a CAPI capable adapter in a CAPI capable slot, as part of firmware configuration prior to enabling operating system use of the adapter, firmware utilizes the CAPI VSEC to activate the adapter in CAPI mode.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing detection of a bimodal coherent accelerator adaptor and selection of operating mode.

Figure 1:
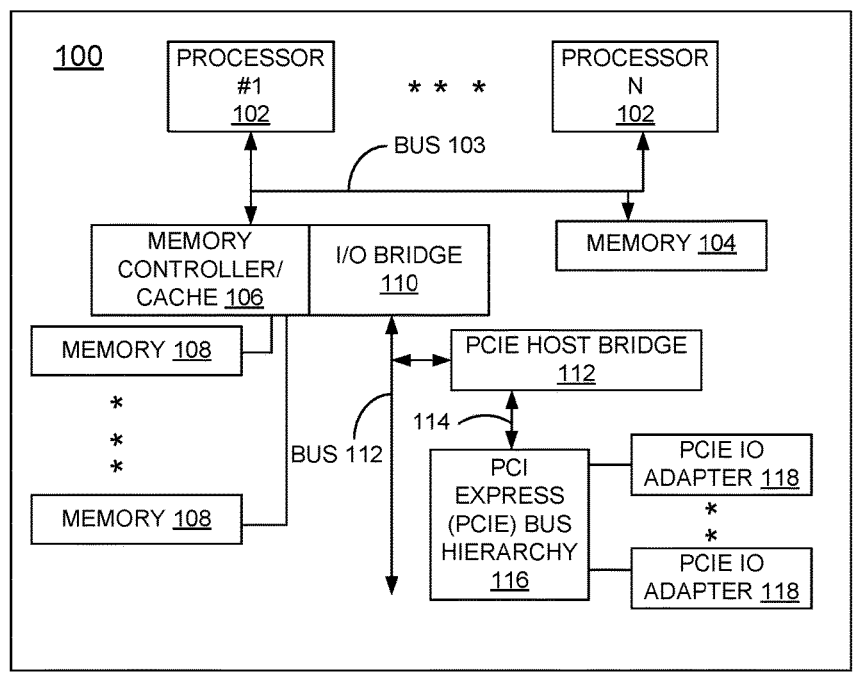
FIGS. 1 and 2 are block diagram representations illustrating an example computer system for implementing modal selection of a bimodal coherent accelerator in accordance with the preferred embodiments.
Figure 2:
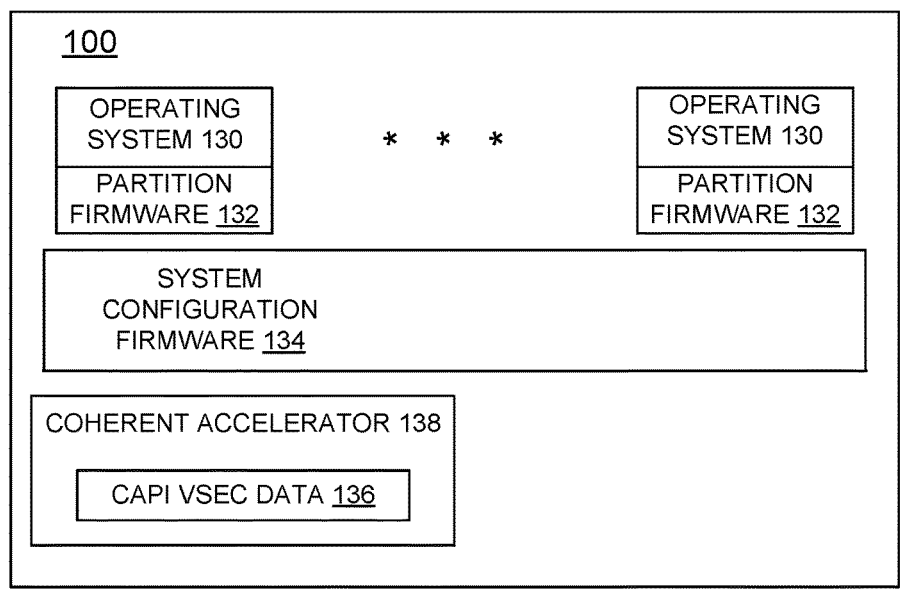

Having reference now to the drawings, in FIGS. 1 and 2, there is shown an example computer system embodying the present invention generally designated by the reference character 100 for implementing modal selection of a bimodal coherent accelerator in accordance with the preferred embodiment. Computer system 100 includes one or more processors 102 or general-purpose programmable central processing units (CPUs) 102, #1-N coupled by a system bus 103 to a memory 104. Computer system 100 includes a memory controller/cache 106 coupled to a plurality of local memories 108. Computer system 100 includes an I/O bridge 110 coupled by an I/O bus 112 to one or more PCI host bridges 112.

PCIE host bridge (PHB) 112 provides an interface for a respective PCI bus 114 to connect to I/O bus 112 and a respective PCI-Express Bus Hierarchy 116 to a plurality of PCIE input/output (IO) adapters 118. The computer system 100 is, for example, logically partitioned such that different PCIE IO adapters 118 may be assigned to different logical partitions. The 110 bridge 110, memory controller/cache 106, and PCIE Host Bridge 112 of the computer system 100 may further include facilities that implement the CAIA so as to enable coherent accelerator adapters to operate in CAPI mode with the processors 102 and memories 108.

As shown in FIG. 2, computer system 100 includes a plurality of operating systems 1-N, 130 together with respective partition firmware 132, a system configuration firmware 134, and CAPI VSEC data 136 included with a coherent accelerator 138 in accordance with the preferred embodiment.

Computer system 100 is shown in simplified form sufficient for an understanding of the invention. Computer system 100 can be implemented with various computers, for example, with one of the computer servers manufactured by International Business Machines Corporation. Computer system 100 can be implemented with one or a plurality of coherent accelerators 138, each having CAPI VSEC data 136. The illustrated computer system 100 is not intended to imply architectural or functional limitations. The present invention can be used with various hardware implementations and systems and various other internal hardware devices.

In accordance with features of the invention, implementing modal selection of a bimodal coherent accelerator is implemented using a PCI-Express standard Vendor Specific Extended Capability (VSEC) structure or CAPI VSEC data 136 in the configuration space of a CAPI-capable PCIE adapter 118 and procedures defined in the Coherent Accelerator Interface Architecture (CAIA) to enable and control a coherent coprocessor adapter over PCIE. PCIE IO adapter 118 are enabled to be bimodal and operate in conventional PCI-Express transaction modes or CAPI modes that utilize CAIA coherence and programming interface capabilities in the 110 bridge 110, PCIE host bridges 112, and memory controller/cache 106. These adapters 118 are enabled to be selectively configured and enabled in either mode by configuration firmware in the server in which these adapters are installed.

In accordance with features of the invention, the presence or absence of the CAPI VSEC indicates that the adapter 118 is or is not capable of coherent accelerator modes of PCIE IO transactions, respectively. The content of the CAPI VSEC data 136 provides for selective enablement of the coherent accelerator mode of operation, to identify to configuration firmware and higher level operating system functions the capabilities and characteristics of the adapter while operating in CAPI mode, and to enable configuration firmware or higher level operating system functions to establish certain operating characteristics of the adapter while operating in CAPI mode.

Figure 3:
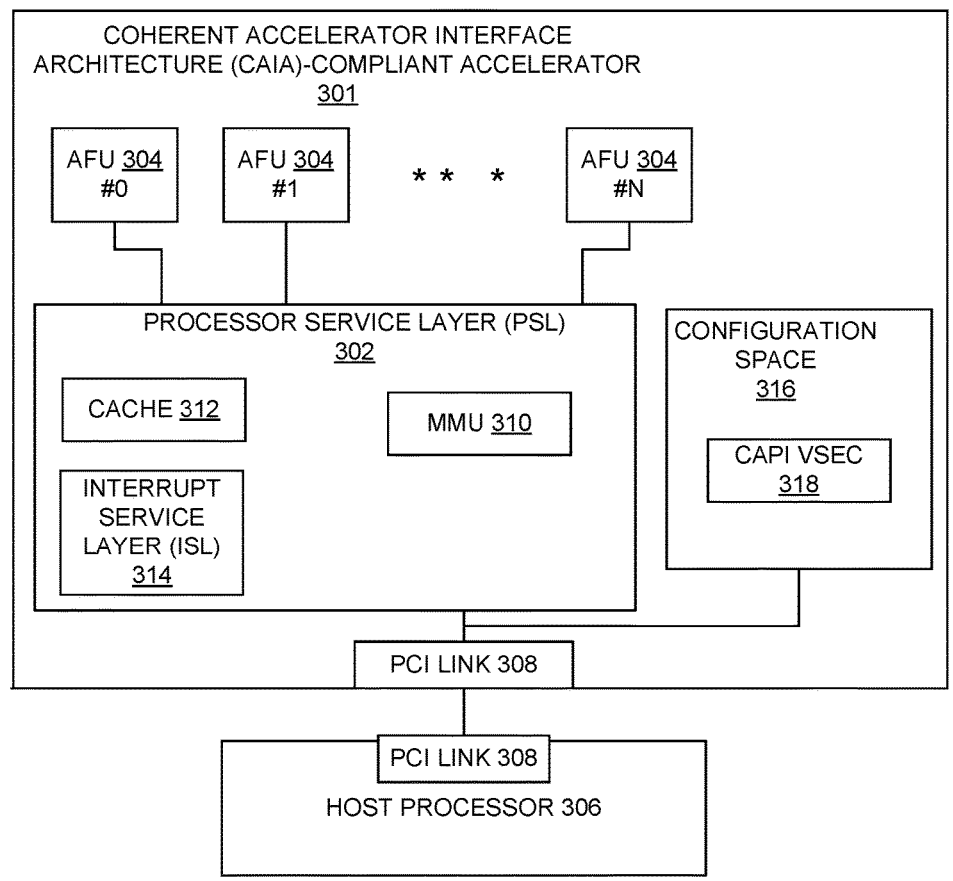
FIG. 3 is a block diagram of example apparatus including a Coherent Accelerator Interface Architecture (CAIA) compliant accelerator unit enabling CAPI coherent accelerator functions over Peripheral Component Interconnect Express (PCIE) in accordance with preferred embodiments.

Referring now to FIG. 3, there is shown an example apparatus generally designated by the reference character 300 enabling CAPI coherent accelerator functions over Peripheral Component Interconnect Express (PCIE). Apparatus 300 includes a Coherent Accelerator Interface Architecture (CAIA) Compliant accelerator 301 enabling CAPI coherent accelerator functions over Peripheral Component Interconnect Express (PCIE) in accordance with preferred embodiments. The CAPI-compliant accelerator 301 includes a Processor Service Layer (PSL) 302, and a plurality of Accelerator Function Units (AFUs) 304, #1-N in accordance with a preferred embodiment. Apparatus 300 includes a host processor 306 including a PCIE link 308 connecting the CAPI-compliant accelerator 301 and the host processor 306. The Processor Service Layer (PSL) 302 includes a Memory Management Unit (MMU) 310, for example including a segment lookaside buffer (SLB), a translation lookaside buffer (TLB), and an effective to real address translation (ERAT) function utilized to maintain coherency with the memories 108 and caches 106 of the computer system 100. The Processor Service Layer (PSL) 302 includes a cache 312 for data accessed by the AFUs 304, #1-N, and an interrupt service layer (ISL) 314 to manage interrupts, and memory management.

The accelerator 301 includes a PCIE configuration space 316 containing CAPI VSEC data in a CAPI VSEC structure 318 linked in the adapter configuration Capability list. Alternatively, the configuration space may contain CAPI VSEC data 318 in other vendor-defined registers within the configuration space 316, vital product data (VPD) or other structures addressed through the configuration space 316, or other structures addresssable through the adapter configuration space 316.

Figure 4:
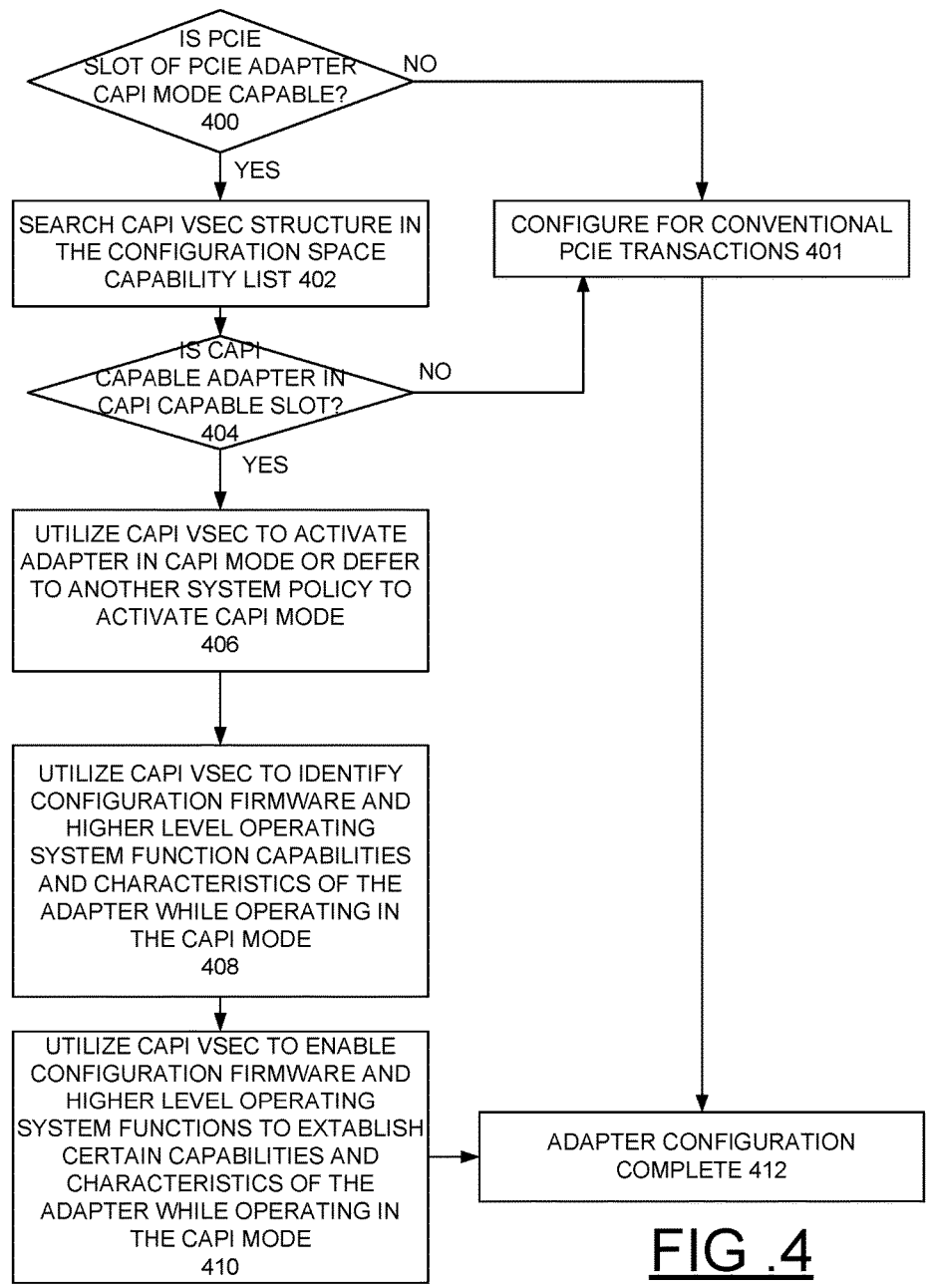
FIG. 4 is a diagram illustrating exemplary mechanisms and methods for implementing modal selection of a bimodal coherent accelerator in accordance with a preferred embodiment.

Referring also to FIG. 4, there are shown exemplary mechanisms and methods for implementing detection and modal selection of a bimodal coherent accelerator in accordance with a preferred embodiment. As indicated in a decision block 400, firmware first determines if the PCIE slot in which an adapter is plugged is itself capable of operating in CAPI mode. The manner in which firmware determines the slot is CAPI capable may utilize hardware status or capability indicators, system VPD, system policies, or other mechanisms suitable for representing to firmware the CAPI mode capabilities of particular PCIE slots. If the slot containing the adapter is CAPI capable, as part of firmware inspection of the adapter PCIE configuration space, the firmware searches for a CAPI VSEC structure in the configuration space Capability list as indicated in a block 402. As the CAPI VSEC is a vendor defined structure, the firmware includes knowledge of specific PCIE vendor IDs that implement a CAPI VSEC according to the inventive definition of the CAPI VSEC. As indicated in a decision block 404, firmware may determine that at any time firmware detects a CAPI capable adapter in a CAPI capable slot, as part of firmware configuration prior to enabling operating system use of the adapter, then firmware utilizes the CAPI VSEC to activate the adapter in CAPI mode or defer to another system policy to activate CAPI mode when during firmware configuration of the adapter the firmware detect that the adapter and slot are mutually CAPI-capable as indicated in a block 406. Other system policies may relate to the type of function the adapter provides, such as storage, network, or computational functions, and whether or not those functions are advantageously utilized in CAPI mode according to the operations of that particular computer system 100 or operating system 130. If firmware determines that either slot, in block 400, or the adapter, in block 404, are not CAPI capable in block 401, or in block 406 according to another system policy that determines the adapter is not to be used in CAPI mode, firmware configures the adapter for conventional PCIE transactions and proceeds to block 412, adapter configuration complete.

As indicated in a block 408, the content of the CAPI VSEC identifies to configuration firmware and higher level operating system functions the capabilities and characteristics of the adapter while operating in CAPI mode. As indicated in a block 410, firmware uses the content of the CAPI VSEC to enable and establish capabilities and characteristics of the adapter while operating in CAPI mode. Adapter configuration is complete as indicated in a block 412.

Figure 5:
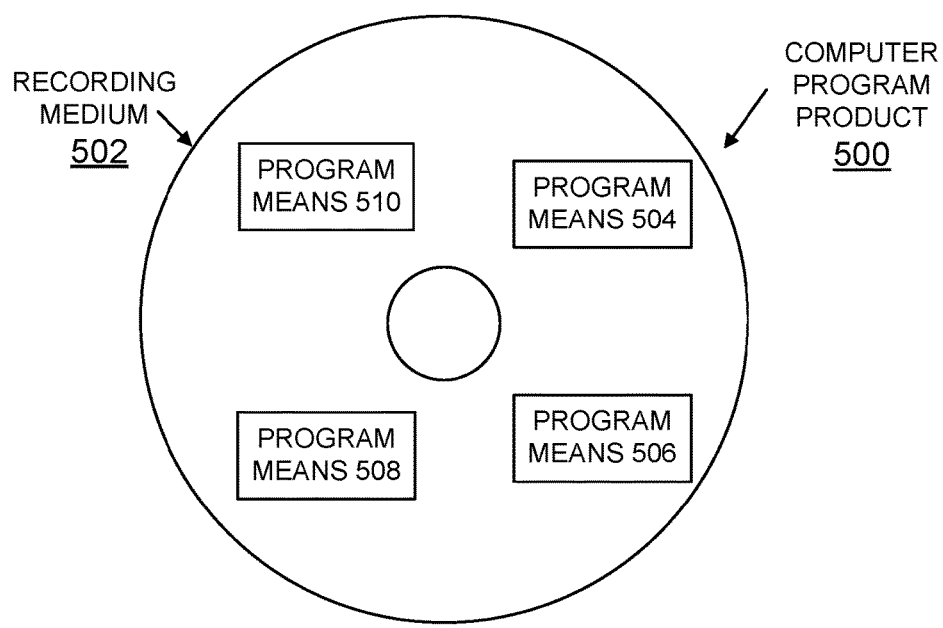
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing modal selection of a bimodal coherent accelerator.

A sequence of program instructions or a logical assembly of one or more interrelated modules defined by the recorded program means 504, 506, 508, and 510, direct the systems 100 for implementing modal selection of a bimodal coherent accelerator of the preferred embodiment.

While the present invention has been described with reference to the details of the embodiments of the invention shown in the drawing, these details are not intended to limit the scope of the invention as claimed in the appended claims.

What is claimed is:

1. A system for implementing modal selection of a bimodal coherent accelerator in a computer system comprising:
   a system processor;
   a Peripheral Component Interconnect Express (PCIE) standard Vendor Specific Extended Capability (VSEC) structure or Coherently Attached Processor Interface (CAPI) VSEC data in the configuration space of a CAPI-capable PCIE adapter;
   said system processor using the CAPI VSEC data in the configuration space of a CAPI-capable PCIE adapter and procedures defined in the Coherent Accelerator Interface Architecture (CAIA) to detect, enable and control a coherent coprocessor adapter over PCIE;
   said system processor enabling the CAPI-capable PCIE adapter to be bimodal and operate in a conventional PCI-Express (PCIE) transaction mode or a CAPI mode utilizing CAIA coherence and programming interface capabilities;
   configuration firmware in the computer system in which the PCIE adapter is installed; and
   said CAPI-capable PCIE adapter is enabled to be selectively configured and enabled in either PCIE transaction mode or CAPI mode by the configuration firmware in the computer system in which the PCIE adapter is installed; and
   said CAPI mode enabling CAPI coherent accelerator functions over PCIE utilizing a Coherent Accelerator Interface Architecture (CAIA) accelerator including the configuration space, a Processor Service Layer (PSL) and a plurality of Accelerator Function Units (AFUs).

2. The system as recited in claim 1, includes a Memory Management Unit (MMU) provided with said Processor Service Layer (PSL) to maintain coherency with memories and caches in the computer system.

3. The system as recited in claim 1, includes a cache provided with said Processor Service Layer (PSL) for data accessed by the Accelarator Function Units (AFUs).

4. The system as recited in claim 1, an interrupt service provided with said Processor Service Layer (PSL) to manage interrupts, and memory management.

5. The system as recited in claim 1, includes a host processor including a PCIE link connecting the Coherent Accelerator Interface Architecture (CAIA) accelerator and the host processor.

6. The system as recited in claim 1, wherein the configuration space of the Coherent Accelerator Interface Architecture (CAIA) accelerator includes Coherent Accelerator Interface Architecture (CAIA) VSEC data.

7. The system as recited in claim 1, wherein content of the CAPI VSEC data is linked in an adapter configuration capability list.

8. The system as recited in claim 1, wherein content of the CAPI VSEC data enables said system processor for identifying configuration firmware and higher level operating system function capabilities and characteristics of the adapter.

9. The system as recited in claim 1, wherein content of the CAPI VSEC data enables sayd system processor to establish certain operating characteristics of the adapter while operating in CAPI mode.

10. The system as recited in claim 1, wherein said Coherent Accelerator Interface Architecture (CAIA) accelerator utilizes CAIA coherence and programming interface capabilities.

* * * * *